United States Patent
D'Angelo et al.

(10) Patent No.: US 7,640,125 B2
(45) Date of Patent: Dec. 29, 2009

(54) METHOD FOR CONTROLLING THE QUALITY OF INDUSTRIAL PROCESSES AND SYSTEM THEREFROM

(75) Inventors: Giuseppe D'Angelo, Grugliasco (IT); Giorgio Pasquettaz, Vercelli (IT); Andrea Terreno, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 639 days.

(21) Appl. No.: 11/080,519

(22) Filed: Mar. 16, 2005

(65) Prior Publication Data
US 2005/0205528 A1 Sep. 22, 2005

(30) Foreign Application Priority Data
Mar. 16, 2004 (EP) ................................. 04425177

(51) Int. Cl.
*G01N 37/00* (2006.01)
(52) U.S. Cl. ..................... 702/81; 702/182; 219/110
(58) Field of Classification Search ............. 702/81–84, 702/108, 127; 219/109, 110; 700/32–34, 700/108–111; 340/3.1, 3.3, 3.42, 3.43, 3.44
See application file for complete search history.

(56) References Cited

U.S. PATENT DOCUMENTS 5,015,815 A 5/1991 Matuschek et al.
5,194,709 A * 3/1993 Ichikawa et al. ............ 219/109
6,335,504 B1 * 1/2002 Ling et al. ................. 219/109

FOREIGN PATENT DOCUMENTS

EP 1 275 464 A1 1/2003

* cited by examiner

*Primary Examiner*—Manuel L Barbee
(74) *Attorney, Agent, or Firm*—Sughrue Mion, PLLC

(57) ABSTRACT

A method for controlling the quality of industrial processes, of the type comprising the steps of: making available one or more reference signals relating to the industrial process acquiring one or more real signals, indicative of the quality of said industrial process, comparing said one or more reference signal to said one or more real signals to identify defects in said industrial process. Said method further includes the operations of: obtaining a real part and an imaginary part from said reference signal; obtaining a real part and an imaginary part from said real signal; computing said real part first comparison dimensions between and said imaginary part from said reference signal; computing second comparison dimensions between said real part and said imaginary part from said real signal; comparing said first comparison dimensions and second comparison dimensions to obtain time location information associated to the presence of defects.

9 Claims, 4 Drawing Sheets

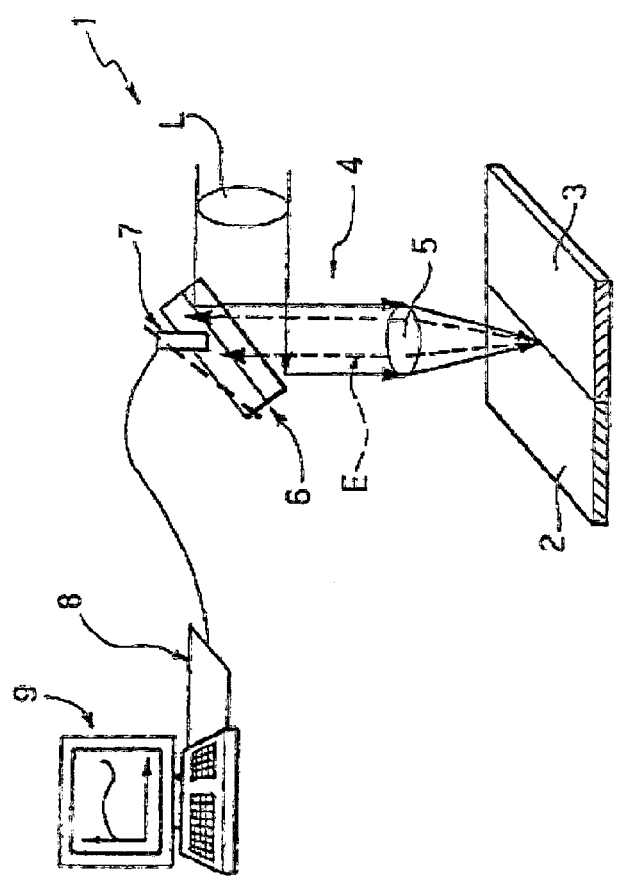
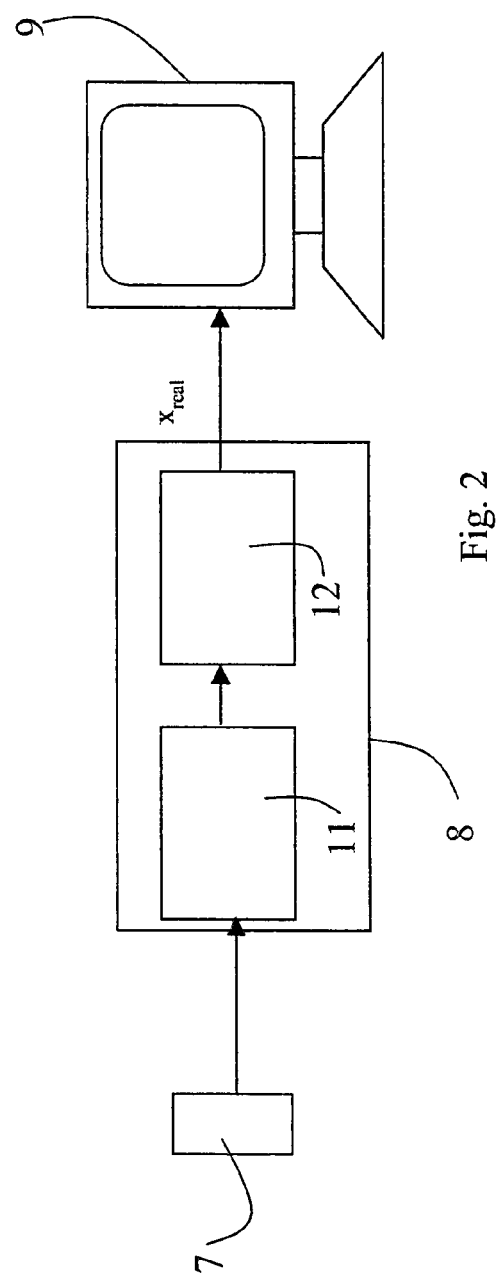

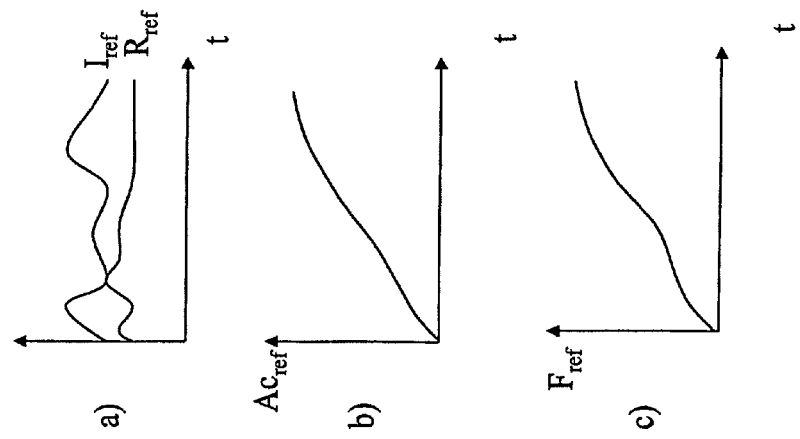
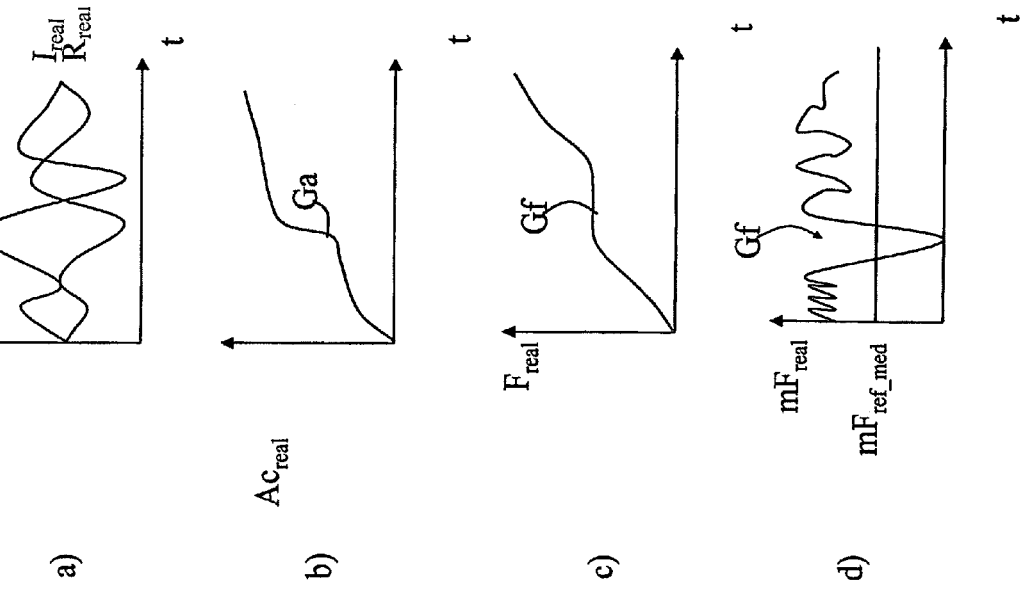

US 7,640,125 B2

METHOD FOR CONTROLLING THE QUALITY OF INDUSTRIAL PROCESSES AND SYSTEM THEREFROM

BACKGROUND OF THE INVENTION

The present invention relates to methods for controlling the quality of an industrial process, comprising the steps of:
  making available one or more reference signals relating to the industrial process
  acquiring one or more real signals indicating the quality of said industrial process,
  comparing said one or more reference signals to said one or more real signals to identify defects of said industrial process.

Monitoring defects in industrial processes is assuming a growing economic importance due to its impact in the analysis of the quality of industrial products. The ability to obtain an assessment of the quality of the industrial process on line and automatically has many advantages, both in economic terms and in terms of process velocity. Therefore, the desirable characteristics of the system are:
  on line and real time processing;
  ability to recognise the main production defects with accuracy.

Currently, the problem of recognising the quality of an industrial process, and thus of identifying any defects, takes place through an off-line inspection conducted by experts, or with automatic methods which, through sensors, identify only some of the aforementioned defects, in a manner that is not satisfactory and that is also sensitive to the different settings of the machine.

Methods and systems for controlling the quality of industrial processes are known, for instance applied to the on-line monitoring of the laser welding process, in particular in the case of metal plate welding. The controlling system is able to assess the presence of porosities in the welded area or, in the case of butt-welded thin metal plates, the presence of defects due to the superposition or to the disjunction of the metal plates.

Such systems in use base quality control on a comparison between the signals obtained during the process and one or more predetermined reference signals, indicative of a high quality weld. Such reference signals, usually in a variable number between two and ten, are predetermined starting from multiple samples of high quality welds. This manner of proceeding implies the presence of an experienced operator able to certify the quality of the weld at the moment of the creation of the reference signals, entails time wastage and at times also material wastage (which is used to obtain the samples needed to obtain the reference signals). It would therefore be necessary, given a similar procedure, onerous in itself in terms of time and cost, for the subsequent procedure of comparison with the reference signal to be able to operate rapidly, in real time and at low cost, which does not take place in currently known systems.

Also known, for example from the European patent application EP-A-1275464 by the same Applicant, are methods that avoid use of the reference by means of procedures of statistical analysis of the radiation emitted by the welding spot; however, these methods allow only a very approximate detection of any defects.

SUMMARY OF THE INVENTION

The object of the present invention is to overcome all the aforesaid drawbacks.

In view of achieving said object, the invention relates to a method for controlling the quality of industrial processes having the characteristics set out in the foregoing and further characterised by the fact that it further comprises the operations of:
  obtaining a real part and an imaginary part from said reference signal;
  obtaining a real part and an imaginary part from said real signal;
  computing first comparison quantities between said real part and said imaginary part from said reference signal;
  computing second comparison quantities between said real part and said imaginary part from said real signal;
  comparing said first comparison quantities and second comparison quantities to obtain time location information associated to the presence of defects.

In the preferred embodiment, said comparison quantities comprise a cumulative area obtained as the absolute value of the difference between said real part and said imaginary part and a phase of the complex value represented by said real part and said imaginary part.

Naturally, the invention also relates to the system for controlling the quality of industrial processes which implements the method described above, as well as the corresponding computer product directly loadable into the memory of a digital computer such as a processor and comprising software code portions to perform the method according to the invention when the product is run on a computer.

BRIEF DESCRIPTION OF THE DRAWINGS

Additional characteristics and advantages of the present invention shall become readily apparent from the description that follows with reference to the accompanying drawings, provided purely by way of explanatory and non limiting example, in which:
FIG. 1 is a block diagram showing a system that implements the method according to the invention;
FIG. 2 shows a detail of the system of FIG. 1;
FIG. 4 shows a plurality of time diagrams relating to first reference quantities processed by the method according to the invention.

DETAILED DESCRIPTION OF THE INVENTION

Figure 3:
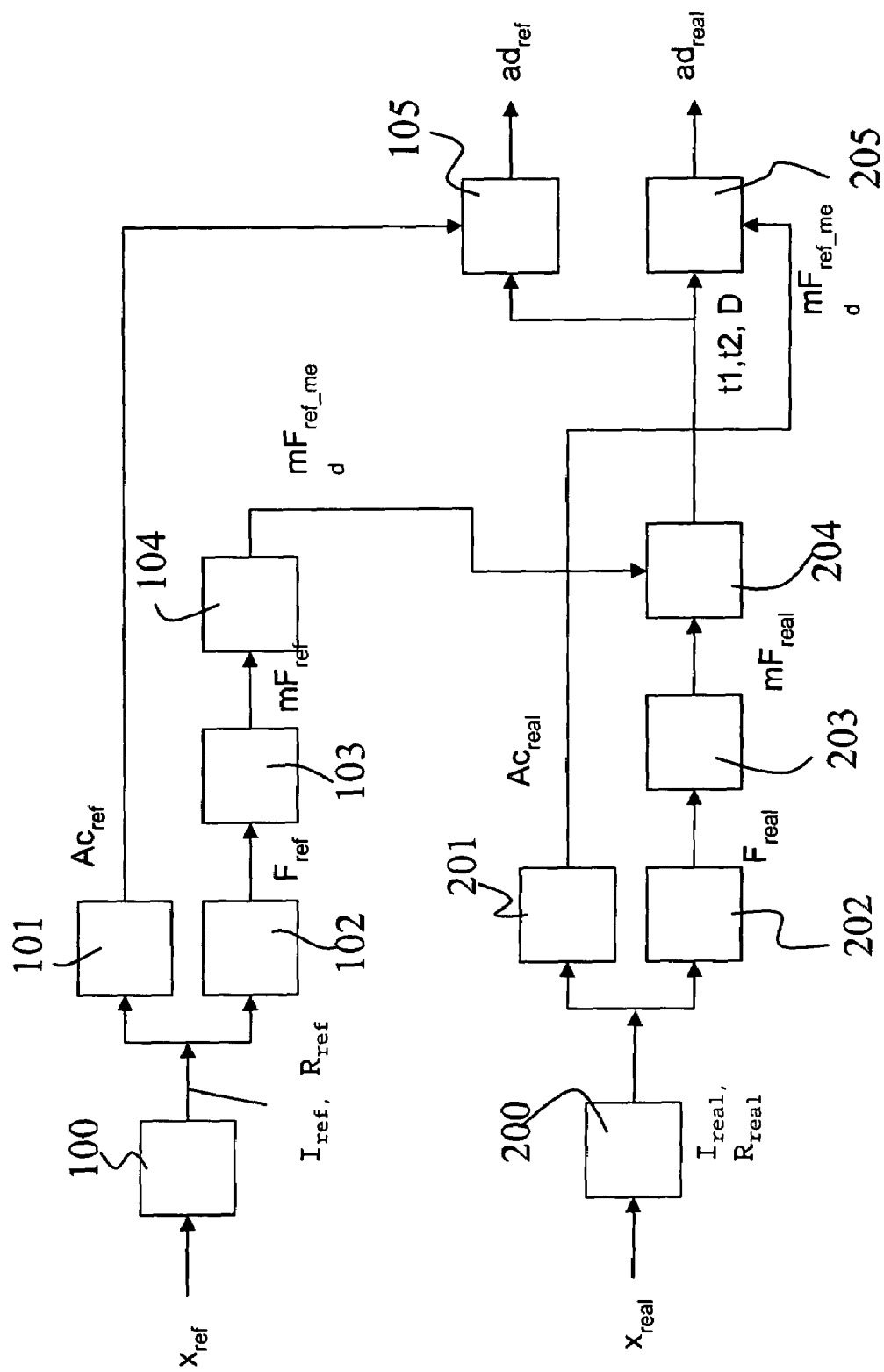
FIG. 3 is a flow chart representing operations of the method according to the invention.

The method according to the invention shall now be exemplified with reference to a laser welding method. Said laser welding method, however, constitutes only a non limiting example of industrial process which can be applied to the method for controlling the quality of industrial processes according to the invention.

With reference to FIG. 1, the number 1 globally designates a system for controlling the quality of a laser welding process. The example refers to the case of two metal plates 2, 3 which are welded by means of a laser beam. The number 4 globally designates the focusing head, including a lens 5 whereat arrives the laser beam originated by a laser generator (not shown) and reflected by a semi-reflecting mirror 6, after the passage through a lens L. The radiation E emitted by the weld area passes through the reflecting mirror 6 and is detected by a sensor 7 constituted by a photodiode able to send its output signal to an electronic control and processing unit 8 associated to a personal computer 9.

In a concrete embodiment, the semi-reflecting mirror 6 used is a ZnSe mirror, with a diameter of 2 inches, thickness 5 mm. The sensor 7 is a photodiode with spectral response between 190 and 1100 nm, an active area of 1.1×1.1 mm and a quartz mirror.

FIG. 2 shows in greater detail the control and processing electronic unit 8 associated to the personal computer 9. Said processing unit 8 comprises an antialiasing filter 11 which operates on the signal sent by the sensor 7, hence an acquisition card 12 is provided, equipped with an analogue-digital converter, which samples the filtered signal and converts it into digital form. Such acquisition card 12 is preferably directly associated to the personal computer 9.

Also in the case of a concrete embodiment, the acquisition card 12 is a PC card NI 6110E data acquisition card, with maximum acquisition frequency of 5 Ms/sec.

The antialiasing filter 11 filters the signal by means of a low pass filter (e.g. a Butterworth IIR filter).

In the personal computer 9, according to the invention, is implemented a method for controlling quality, based on a comparison between a real signal $x_{real}$ acquired by means of the photodiode 7 and a reference signal $x_{ref}$, representing a defective weld, stored in said personal computer 9.

The reference signal is acquired at an acquisition frequency $f_s$, and hence, according to Nyquist's theory, has associated a frequency band of the signal with value $f_s/2$, whilst the number of samples acquired for the reference signal $x_{ref}$ is N.

FIG. 3 shows a flow chart which represents the operations conducted on the reference signal $x_{ref}$.

In a first step 100 is executed an operation of transformation of the reference signal $x_{ref}$ by the application of a Hilbert transform, obtaining a complex analytical signal $x_{ref\_h}$, comprising respectively a real part $R_{ref}$ and an imaginary part $I_{ref}$. Said real part $R_{ref}$ and imaginary part $I_{ref}$ are shown in the diagram as a function of time t, shown in FIG. 4a.

Said real part $R_{ref}$ and imaginary part $I_{ref}$ are sent as inputs in parallel respectively to a block 101 in which is executed a step of computing a cumulative area of the reference signal $Ac_{ref}$ and to a block 102 in which is calculated a phase of the reference signal $F_{ref}$.

The cumulative area of the reference signal $Ac_{ref}$, represented qualitatively in the diagram of FIG. 4b, constitutes an evaluation by comparison between the imaginary part and the real part of the complex analytical signal $x_{ref\_h}$, in this case a comparison between the amplitudes, which is computed as the absolute value of the difference between the imaginary part $I_{ref}$ and the real part $R_{ref}$, i.e.:

$$Ac_{ref} = |I_{ref} - R_{ref}| \quad (1)$$

A constant growth of the cumulative area of the reference signal $Ac_{ref}$ as a function of time indicates a process that is free from amplitude defects.

Therefore, to obtain a comparison on frequency, the phase of the reference signal $F_{ref}$, represented qualitatively in the diagram of FIG. 4c, is computed as the arctangent of the ratio between the imaginary part $I_{ref}$ and the real part $R_{ref}$, i.e.:

$$F_{ref} = arctg\left(\frac{I_{ref}}{R_{ref}}\right) \quad (2)$$

A constant growth of the phase of the reference signal $F_{ref}$ indicates a process that is free from frequency defects.

In a subsequent block 103, an angular coefficient $mF_{ref}$ of the phase of the reference signal $F_{ref}$ as a function of time is then calculated. In a subsequent block 104, an average value $mF_{ref\_med}$ of said angular coefficient $mF_{ref}$ of the phase of the reference signal $F_{ref}$ as a function of time is then calculated.

For what concerns the real signal $x_{real}$, on it too is executed a transformation operation by the application of a Hilbert transform, obtaining a complex analytical signal $x_{real\_h}$, comprising respectively a real part $R_{real}$ and an imaginary part $I_{real}$. Said real part $R_{real}$ and imaginary part $I_{real}$ are shown in the diagram as a function of time t, shown in FIG. 5a.

Said real part $R_{real}$ and imaginary part $I_{real}$ are sent as inputs in parallel respectively to a block 201 in which is executed a step of computing a cumulative area of the real signal $Ac_{real}$ and to a block 202 in which is calculated a phase of the real signal $F_{real}$.

Figure 5:
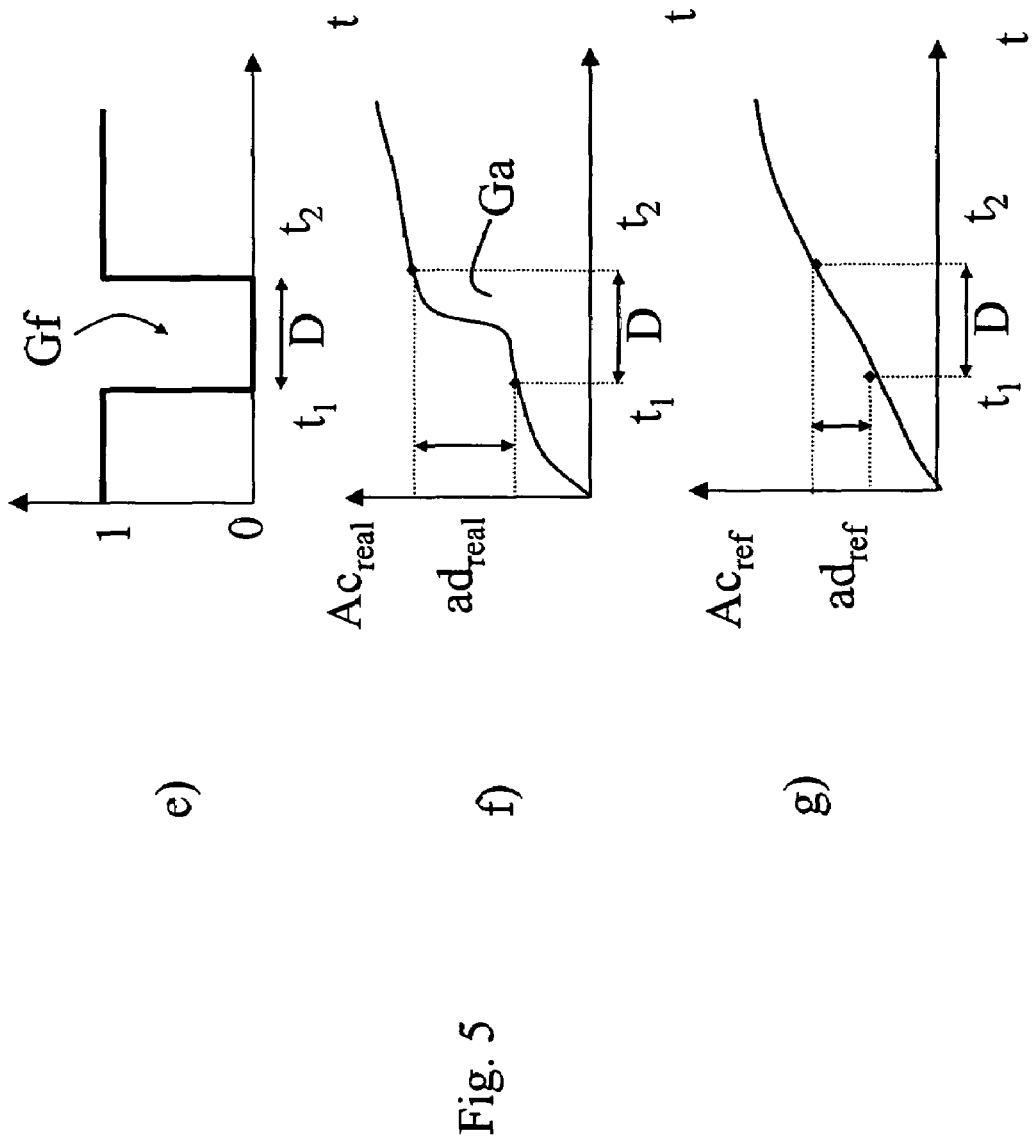
FIG. 5 shows a plurality of time diagrams relating to second reference quantities processed by the method according to the invention.

The cumulative area of the real signal $Ac_{real}$, represented qualitatively in the diagram of FIG. 5b, is computed as the absolute value of the difference between the imaginary part $I_{real}$ and the real part $R_{real}$ of the Hilbert transform of the real signal $X_{real}$, i.e.:

$$Ac_{real} = |I_{real} - R_{real}| \quad (3)$$

It is readily apparent that the cumulative area of the real signal $Ac_{real}$ exhibits a sharp transition, which can be an inflection point with vertical tangent, associated to an amplitude defect Ga.

The phase of the real signal $F_{real}$, represented qualitatively in the diagram of FIG. 5c, is computed as the arctangent of the ratio between the imaginary part $I_{real}$ and the real part $R_{real}$, i.e.:

$$F_{real} = arctg\left(\frac{I_{real}}{R_{real}}\right) \quad (4)$$

It is readily apparent that the phase of the real signal $F_{real}$ exhibits a sharp transition, which can be a horizontal flex, associated to a frequency defect Gf.

To determine the time position of said frequency defect Gf, the phase of the real signal $F_{real}$ is sent to a block 203, in which is computed an angular coefficient $mF_{real}$ of the phase of the real signal $F_{real}$ as a function of time.

Said angular coefficient $mF_{real}$ of the phase of the real signal $F_{real}$ and the angular coefficient $mF_{ref\_med}$ of the phase of the reference signal $F_{ref}$ calculated at the block 104 are sent to a comparison block 204, which outputs time instants $t_1$ and $t_2$, in which the angular coefficient $mF_{real}$ of the phase of the real signal $F_{real}$ is greater than the angular coefficient $mF_{ref\_med}$ of the phase of the reference signal $F_{ref}$, as shown in FIG. 5d. Said time instants $t_1$ and $t_2$ define a time window with time length D, which substantially, since, as stated, the signals are sampled, indicates a number of samples for which the condition of the comparison block 204 is verified and hence a frequency defect Gf is present.

Said time instants $t_1$ and $t_2$ are then provided as inputs in parallel respectively to a block 205, which also receives the cumulative area of the real signal $Ac_{real}$ and evaluates a defect amplitude $ad_{real}$ at the time window of time length D, as well as a block 205, which receives as an input the cumulative area $Ac_{ref}$ of the reference signal, in which similarly is evaluated a reference amplitude $ad_{ref}$ at the time window of time length D. The time diagrams relating to the operations performed by said blocks 105 and 205 are shown in FIGS. 5f and 5g respectively. Therefore, it is possible successively to perform, by means of the control and processing electronic unit 8 associated to the personal computer 9, additional processing operations comparing the reference amplitude $ad_{ref}$ and the defect amplitude $ad_{real}$, to obtain additional information on the size and nature of the defect.

This comparison is effected in the following manner: after obtaining the cumulative areas of the reference signal $Ac_{ref}$ and of the real signal $Ac_{real}$, the maximum vertical variation of the cumulative area of the reference signal $Ac_{ref}$ is calculated instant by instant. The cumulative area of the real signal $Ac_{real}$ is then analysed and the vertical variations in this signal are compared with the maximum calculated value for the cumulative area of the reference signal $Ac_{ref}$. Amplitude defects are thereby highlighted.

Thus, the method described above allows to locate defects in the time domain. Since the method always operates in the time domain, without using transformations in other domains, advantageously the locating operation is more precise. Moreover, the absence of domain transformations allows for an easier and less costly implementation in processing systems, for example an FPGA circuit for implementing the method described above is much more simplified.

Naturally, without altering the principle of the invention, the construction details and the embodiments may vary widely from what is described and illustrated purely by way of example herein, without thereby departing from the scope of the present invention.

The invention claimed is:

1. A method for controlling the quality of an industrial process, of the type comprising the steps of:
    making available one or more reference signals relating to the industrial process;
    acquiring one or more real signals, indicative of the quality of said industrial process;
    comparing, using a processing unit, said one or more reference signal to said one or more real signals to identify defects in said industrial process, said comparing operation including:
        obtaining a real part and an imaginary part from said reference signal; and
        obtaining a real part and an imaginary part from said real signal;
    wherein said comparing operation further comprises the operations of:
        computing first comparison quantities by performing a comparison between values of said real part and of said imaginary part from said reference signal;
        computing second comparison quantities by performing a comparison between values of said real part and of said imaginary part from said real signal; and
        comparing said first comparison quantities and said second comparison quantities to obtain time location information associated to the presence of defects.

2. A method as claimed in claim 1, wherein said step of computing the first comparison quantities comprises a step of computing a reference phase and corresponding first angular coefficients of said reference phase and said step of computing the second comparison quantities comprises a step of computing a real phase and corresponding second angular coefficients of said real phase,
    said operation of comparing said first comparison quantities and second comparison quantities comprising the comparison of said first angular coefficients and second angular coefficients to identify a time window for locating a frequency defect.

3. A method as claimed in claim 2, wherein said first angular coefficients comprise a mean valve value of the angular coefficient of the reference signal.

4. A method as claimed in claim 2, wherein said step of computing the first comparison quantities comprises a step of computing a reference cumulative area and said step of computing the- second comparison quantities comprises a step of computing a cumulative area of the real signal.

5. A method as claimed in claim 4, wherein it further comprises a step of evaluating a variation amplitude of said cumulative reference area in said time window, a step of evaluating a variation amplitude of said cumulative reference area of the real signal in said time window to evaluate an amplitude defect.

6. A method as claimed in claim 4, wherein said cumulative areas computed as the absolute value of the difference between the respective imaginary parts and real parts.

7. A method as claimed in claim 1, wherein said operations of obtaining a real part and an imaginary part from said reference signal and of obtaining a real part and an imaginary part from said real signal are obtained by means of a Hilbert transform.

8. A method as claimed in claim 1, wherein said industrial process is a laser welding process.

9. A system for controlling the quality industrial process, comprising:
    sensor means for measuring one or more process parameters,
    an electronic control and processing unit for processing the signals emitted by said sensor means,
    wherein:
    said electronic control and processing unit to process the signals emitted by said sensor means implements the method for controlling the quality of an industrial process as claimed in claim 1.

* * * * *